3,534,586
LEAKAGE MONITOR
Hugh Matthews, Northport, N.Y., assignor to Arkwin Industries, Inc., Westbury, N.Y., a corporation of New York
Filed Feb. 26, 1969, Ser. No. 802,581
Int. Cl. G01m 3/02
U.S. Cl. 73—46                    9 Claims

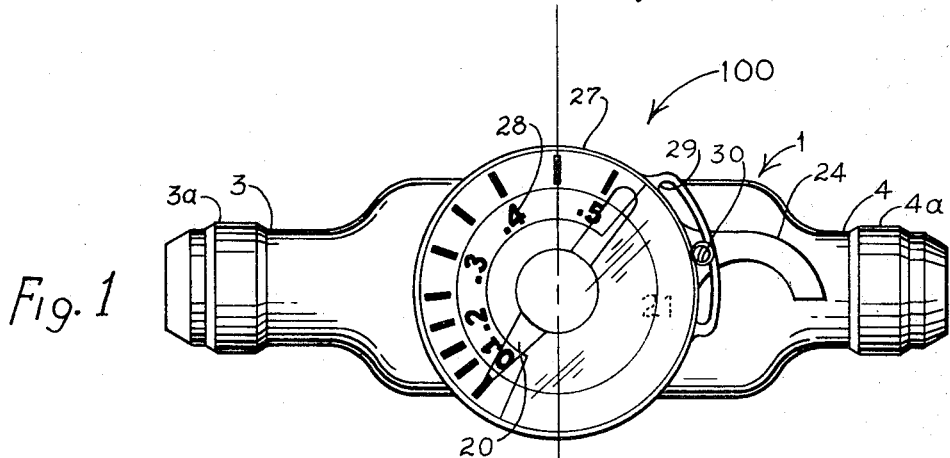
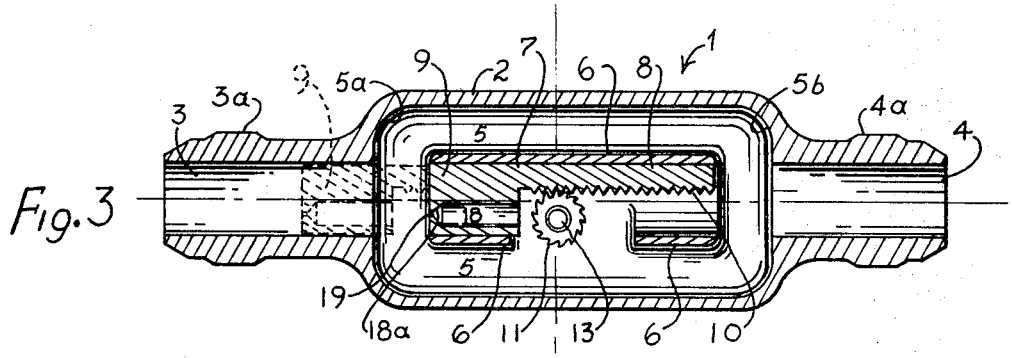
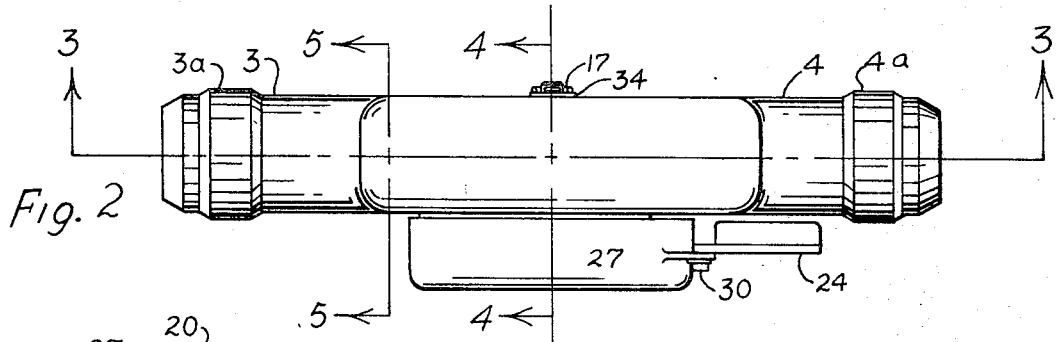
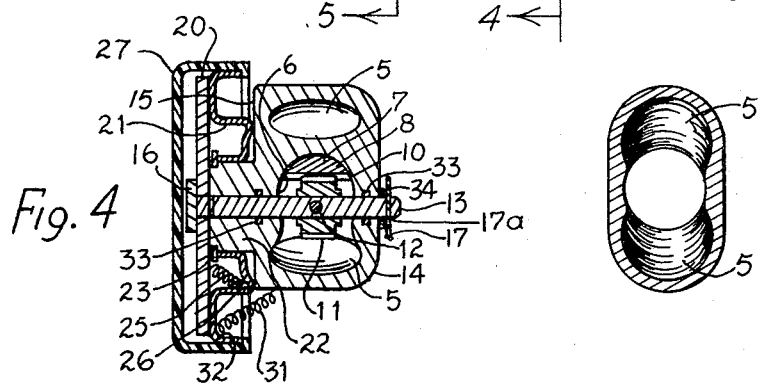
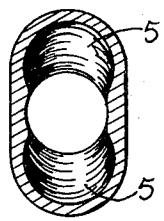
Oct. 20, 1970     H. MATTHEWS     3,534,586
LEAKAGE MONITOR
Filed Feb. 26, 1969
INVENTOR
HUGH MATTHEWS
BY
ATTORNEY

United States Patent Office 3,534,586
Patented Oct. 20, 1970

ABSTRACT OF THE DISCLOSURE

A leakage monitor for finding standby leakage flows in a hydraulic system or components thereof, when the fluid flows are only $\frac{1}{25}$ or $\frac{1}{50}$, or lower, of the magnitude of normal flows in the system. The monitor is placed in series within the system with negligible pressure drops when high pressure fluid is passed therethrough. The monitor has a metering piston movable to a flow detecting position by displacement of an actuator having a spring means connected thereto, whereby movement of the piston positioned in a flow restrictive position will indicate leakage on a gauge connected thereto.

BACKGROUND OF THE INVENTION

Field of the invention

This invention relates to a leakage monitor in a hydraulic, or fluid flow, system for detecting the leakage of internal fluid in the system circuit when the system is in an at rest condition. The leakage monitor is positioned in and connected in series in the fluid flow path between any two points, or positions, of the system between which there is a leakage test, or finding, to be made, and the leakage monitor enables the normal passage of fluid therethrough at high fluid flow rates, during operation of the system, without any negligible pressure drop while, on the other hand, permitting the detection, or finding, of standby internal leakage, when the system is in at rest condition, amounting to a substantially lower fluid flow, for example, $\frac{1}{25}$ to $\frac{1}{50}$, or lower, the magnitude of normal flows.

The leakage monitor is particularly useful in fluid systems having a relatively large number of components, for example, in aircraft fluid systems, or hydraulic systems, having a large number of component sub-systems requiring a comparable, and therefore, large number of leakage monitors in order to test each component sub-system for leakage of fluid when the entire system is in at rest condition. Quite obviously, if a hydraulic system installation required twenty-five fluid leakage monitoring devices, a low cost positive acting leakage monitor is necessary if such devices are to be permanently installed within each sub-system of the hydraulic system. The leakage monitor of this invention is such a low cost positive acting fluid leakage finding device.

The leakage monitor of this invention comprises a small number of component elements not requiring close tolerance fabrication usually expected for component elements of such a device. By manipulation of an externally mounted dial plate a sliding metering piston within the leakage monitor body is placed therein in a fluid restrictive position, or a fluid closing position, by means of a torsion spring, for example, a helical or spiral torsion spring, drive. The resistance offered to the closing of the metering piston by any fluid leakage is reflected by the relative positions of the dial plate and the indicating needle pointer fixedly attached to metering piston displacing means.

Description of the prior art

Fluid flow devices having sliding piston members movable to regulate fluid flow therethrough, as presently known, are disclosed in such U.S. patents as the Goodman et al. U.S. Pat. No. 2,776,673 and the Sands U.S. Pat. No. 3,122,162. Likewise disclosed by the prior art is a dual orifice valve body as shown in the Walker et al. U.S. Pat. No. 3,321,970. Valve members having external regulating means together with a dial and indicating pointer needle or other indicating means for signalling the internal condition of the valve are disclosed in the Long U.S. Pat. No. 2,554,040, the Horton U.S. Pat. No. 3,346,006 and the Gilmont U.S. Pat. No. 3,390,702. Automatic change-over devices are shown by the Thomas U.S. Pat. No. 2,138,989.

In the prior art fluid valve members are moved or pushed in the direction of fluid flow to restrict the flow with the result that the piston components of such prior art valve members present a significant restriction to the normal fluid flow and any relative finding or determination of fluid flow leakage in a system in at rest condition is incapable of determination and, furthermore, with the result that any economically made and easily usable leakage monitor has not been provided, particularly one wherein there is spring means in easy and simple combination with the other component parts.

SUMMARY OF THE INVENTION

The leakage monitor of this invention includes a valve body having sliding metering piston therewithin movable from its normal at-rest position offering negligible flow restriction to a closing position upstream of the fluid flow whereby the very small fluid flow orifice in the piston head allows leakage to be detected or found as a reading from the indicating needle or pointer operatively associated with said metering piston through transversely positioned means in the valve body for movement with the piston. The magnitude of the leakage in an at-rest condition is reflected by the relative displacement of the dial plate which drives the needle and piston by means of a torsion spring, against the flow of the leakage flow.

One of the objects of this invention is to provide a leakage monitor for use in series in a fluid circuit, having a torsion spring means driven metering piston movable against the direction of fluid leakage flow to reflect the degree of leakage flow by external indicating means.

Another object of this invention is to provide a leakage monitor having a dial plate displaceable to tension a spring having an indicating needle connected thereto with a metering piston operatively associated therewith.

Other objects and features of this invention will be readily apparent from the following detailed description which is not limited but only illustrative of the preferred embodiment of this invention.

BRIEF DESCRIPTION OF THE DRAWINGS

FIG. 1 is a side elevation of the leakage monitor of this invention in its at-rest position.

FIG. 2 is a top plan of the leakage monitor of FIG. 1.

FIG. 3 is a cross-sectional view taken on line 3—3 of FIG. 2, showing a portion thereof in broken lines during operation thereof.

FIG. 4 is a cross-sectional view taken on line 4—4 of FIG. 2.

FIG. 5 is a cross-sectional view taken on line 5—5 of FIG. 2.

DESCRIPTION OF THE PREFERRED EMBODIMENT

Elements or groups of elements which are conventional and generally widely known in the field to which the leakage monitor of this invention relates of course form a part of the leakage monitor of this invention herein described, and their exact nature or type is not here described in detail for the reason that a person skilled in the art can understand and use the leakage monitor of this invention without a detailed recitation of such conventional and generally widely known elements or groups of elements.

More particularly, the leakage monitor 100 includes valve body 1 including central portion 2 having primary fluid flow passage 5 therewithin and terminating at opposite ends in fluid inlet pipe nipple 3 and fluid outlet pipe nipple 4.

As is readily apparent, leakage monitor 100 is for connection in series in the fluid flow path of a hydraulic circuit system and of course in any sub-system of such a hydraulic circuit system, and in such respect said nipples 3 and 4 are provided with attachment means such as ridges 3a and 4a, or pipe threads (not shown) or threaded swivels (not shown) or equivalent attaching means.

Within central body portion 2 is longitudinal support sleeve member 6 with its central axis axially aligned with inlet 3 and outlet 4, the respective ends of which are spaced from front and rear limits 5a and 5b, respectively, of primary fluid flow passage 5. Slidably mounted for axial movement within the confines of sleeve 6 is metering piston 7 having longitudinal side wall 8 extending rearwardly from piston head 9. As readily apparent from the appended drawings, particularly FIG. 3, the diameter of piston head 9 is such that there is provided a sliding fluid-tight fit when piston head 9 is positioned, or disposed, within inlet 3.

During normal operation of the hydraulic circuit system, or sub-system, including therewithin leakage monitor 100, metering piston 7 is positioned as shown in full lines in the appended drawings, particularly FIG. 3, i.e., with piston 7 fully retracted within support or guide sleeve 6 with the result that no significant restriction is imparted to the flow of fluid as it enters inlet 3, passes through the upper and lower channels of primary fluid passage 5 and then through inlet 4. When the hydraulic system, or sub-system, is in at-rest condition and it is desired to test for or find the existence of fluid flow leakage, metering piston 7 is displaced to the position shown by the broken lines in FIG. 3, as shall be hereinafter set forth. The lower surface of piston side wall 8 is provided with longitudinal gear rack 10 which is in constant mesh with pinion gear 11. Gear 11 is fixedly secured by rivet 12 to shaft 13 for rotation therewith and shaft 13 extends and is positioned through central portion 2 of valve body 1, as clearly shown in the appended drawings. A smooth rotary fit is provided shaft 13 journalled through rear wall 14 and front wall 15 of valve body 1, and packing seals 33, 33 are used. The front portion of shaft 13 is provided with enlarged head 16, and the rear portion of shaft 13 includes in combination therewith cotter pin 17, through opening 17a of shaft 13, and lock washer 34 therearound as retaining means therefor. Piston head 9 of metering piston 7 is provided with bore 18, connecting conically shaped bore 18a and connecting substantially reduced diameter orifice 19 terminating at the forward face of piston head 9, as clearly shown in appended drawings.

Indicating needle or pointer 20 is fixedly secured to the front end of shaft 13. Positioned, or disposed, between needle 20 and central body portion 2 is circular dial plate 21, freely journalled on outwardly extending neck 22 on front wall 15. Although free to rotate with respect to needle 20 and shaft 13, dial plate 21 is axially secured by means of suitable retaining ring 23.

In the operation of leakage monitor 100, as hereinbefore indicated, metering piston 7 must be axially displaced to the broken line position as shown in FIG. 3. The foregoing is accomplished by arcuately displacing dial plate 21 in a counter-clockwise direction through the agency of actuating arm 24 integral with dial plate 21. The drive means for causing piston 7 to move upon rotation of dial plate 21 comprises calibrated spring, such as torsion coiled spring, 25 connected at one end thereof to inner channel 26 of dial plate 21 and at the other end thereof to needle or pointer 20. As dial plate 21 and, of course, actuating arm 24 are rotated counter-clockwise, torsion spring 25 is tensioned and causes needle 20 to move in the same direction. Thusly, needle 20, being fixedly secured to shaft 13, in so moving or turning causes shaft 13 and pinion gear 11 fixedly secured to shaft 13 for rotation therewith to rotate, and pinion gear 11 being in mesh with rack gear 10 causes rack gear 10 to move piston 7 and to move piston head 9 into inlet 3. Actuating arm 24 can be moved about three quarters of a turn for all tests in order to move piston head 9 into inlet 3, but the specific reading obtainable in each testing instance depends upon the actual pressure of the leaking fluid present since the specific pressure of the leaking fluid against the face of piston head 9 determines the force to be applied to, or the tension to be placed on, torsion spring 25 to displace or move piston 7, and thusly variations in the pressure of the leaking fluid, or in the leakage pressure, is reflected by the relative positioning of needle pointer 20 and transparent dial face 27 secured to dial plate 21 and displaced therewith. As is clearly apparent, in testing for leakage, actuating arm 24 including dial face 21 is turned or cranked counter-clockwise for approximately ¾ of a turn. Torsion spring 25 is connected to indicating needle or pointer 20 and also to actuating arm 24 including dial face 21. When actuating arm 24 is turned, needle 20 is likewise rotated. Needle 20 is fixedly secured to shaft 13 to which pinion gear 11 is likewise fixedly secured. Pinion gear 11 causes piston 7 to move, as hereinbefore set forth. In such movement the convolutions of spring 25 are tightened to rotate the needle 20 against the fluid leakage force. In order to obtain a usable reading, a quantitative value of degree of leakage is obtained by providing suitable indicia 28 on dial face 27. In addition to providing calibration by selecting the size of the piston head orifice 19 and the tension of spring 25, adjustment is made in the field by suitable adjustment means for adjustable attachment of dial face 27 to dial plate 21. Dial face 27 includes arcuate slot 29 and lock screw 30 passing therethrough to actuating arm 24 including dial plate 21. After noting the relative positions of needle or pointer 20 and dial face 27 with arm 24 in the test position hereinbefore described, arm 24 is released and returns to its normal position, as shown in the appended drawings, particularly FIG. 1, with the aid of return spring 31, which assures the return of dial plate 21 to zero upon release of arm 24. Spring 31 is connected at one end thereof to valve body 1 and at the other end thereof to outer channel 32 of dial plate 21.

Many alterations and changes may be made without departing from the spirit and scope of this invention which is set forth in the appended claims which are to be construed as broadly as possible in view of the prior art.

I claim:

1. A leakage monitor positioned in and connected in series with a hydraulic system for finding leakage in said hydraulic system, comprising, in combination,
  a valve body having a central portion with a primary fluid passage having a fluid inlet and a fluid outlet,
  a metering piston slidably positioned within said primary fluid passage,
    said metering piston having a piston head for being received and positioned in said fluid inlet,
  transversely positioned means in and through said valve body central portion primary fluid passage for displacing said piston, including its piston head, toward and into said fluid inlet, and
  movable means for operating said transversely positioned piston displacing means to move said piston head into said fluid inlet,
    said movable means being exteriorly positioned with respect to said valve body primary fluid passage and including an actuating arm and spring means for connecting said arm and said displacing means.

2. The leakage monitor of claim 1 wherein said actuating arm includes a dial plate freely journalled on said valve body central portion.

3. The leakage monitor of claim 1 wherein said movable means includes an indicating pointer fixedly positioned on and movable with said transversely positioned piston displacing means and said actuating arm includes a dial plate freely journalled on said valve body central portion, said spring means being connected to said indicating pointer.

4. The leakage monitor of claim 1 wherein said piston head is provided with fluid passageway means therethrough for allowing fluid to pass from said fluid inlet to said primary fluid passage.

5. The leakage monitor of claim 1 wherein said piston head is provided with fluid passageway means therethrough for allowing fluid to pass from said fluid inlet to said primary fluid passage, said fluid passageway means having an orifice opening into said fluid inlet.

6. The leakage monitor of claim 1 wherein said actuating arm includes a dial plate freely journalled on said valve body central portion, said dial plate including an indicia bearing member in fixed overlying relationship therewith.

7. The leakage monitor of claim 1 wherein said transversely positioned piston displacing means includes pinion rack and pinion gear means for moving said piston.

8. The leakage monitor of claim 1 wherein said transversely positioned piston displacing means includes rack and pinion gear means for moving said piston,
said rack and pinion gear means including a rack on said metering piston and a pinion gear in mesh with said rack, and
a shaft positioned in and through said valve body central portion,
said pinion gear being fixedly mounted on said shaft for rotation therewith.

9. The leakage monitor of claim 1 wherein said transversely positioned piston displacing means includes rack and pinion gear means for moving said piston,
said rack and pinion gear means including a rack on said metering piston and a pinion gear in mesh with said rack, and
a shaft positioned in and through said valve body central portion,
said pinion gear being fixedly mounted on said shaft for rotation therewith,
wherein
said movable means includes an indicating pointer fixedly positioned on and movable with said shaft, and wherein
said actuating arm of said movable means includes a dial plate freely journalled on said valve body central portion,
said spring means being connected to said indicating pointer and to said dial plate of said actuating arm.

References Cited

UNITED STATES PATENTS

| | | | |
|---|---|---|---|
| 1,326,247 | 12/1919 | Zengel | 138—45 |
| 2,138,989 | 12/1938 | Thomas et al. | 226—6 |
| 3,090,221 | 5/1963 | Cosby | 73—40 |
| 3,451,431 | 6/1969 | Royer | 138—46 |

LOUIS R. PRINCE, Primary Examiner

W. A. HENRY II, Assistant Examiner

U.S. Cl. X.R.

73—210